(12) United States Patent
Yamashita et al.

(10) Patent No.: US 10,290,957 B2
(45) Date of Patent: May 14, 2019

(54) TERMINAL-EQUIPPED WIRE AND WIRE HARNESS WITH RESIN COATING ON TERMINAL FITTING

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Takuya Yamashita, Mie (JP); Tetsuya Nakamura, Mie (JP); Yoshiaki Yamano, Mie (JP); Junichi Ono, Mie (JP); Takuji Otsuka, Mie (JP); Takaaki Ito, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/993,989

(22) Filed: May 31, 2018

(65) Prior Publication Data
US 2018/0366842 A1 Dec. 20, 2018

(30) Foreign Application Priority Data

Jun. 16, 2017 (JP) ................................. 2017-118332

(51) Int. Cl.
*H01R 9/05* (2006.01)
*H01R 4/70* (2006.01)
(Continued)

(52) U.S. Cl.
CPC ............ *H01R 4/70* (2013.01); *B60R 16/0207* (2013.01); *H01B 3/421* (2013.01); *H01B 7/0045* (2013.01);
(Continued)

(58) Field of Classification Search
CPC .. H01R 9/0518; H01R 13/52; H01R 13/5221; H01R 43/048; H01R 33/965
(Continued)

(56) References Cited

U.S. PATENT DOCUMENTS

| 7,004,789 | B2 * | 2/2006 | Kameyama | ........ H01R 13/5216 439/274 |
| 2013/0199842 | A1 * | 8/2013 | Inoue | ....................... H01R 4/62 174/84 C |

FOREIGN PATENT DOCUMENTS

JP 2003297447 A 10/2003

* cited by examiner

*Primary Examiner* — Abdullah A Riyami
*Assistant Examiner* — Justin M Kratt
(74) *Attorney, Agent, or Firm* — Reising Ethington, P.C.

(57) ABSTRACT

A terminal-equipped wire includes a wire with a core wire and an insulating coating with which the core wire is coated, and a terminal fitting that is attached to a leading end of the wire. The terminal fitting is electrically connected to the core wire in a core-wire crimp portion, and is fixed to the wire from an external side of the insulating coating in a coating crimp portion that is located rearward of the core-wire crimp portion in a longitudinal direction of the wire. The terminal-equipped wire also includes a resin-coated portion where a region containing the core-wire crimp portion and the coating crimp portion is coated with a resin. The resin-coated portion has a thin-walled portion with a reduced thickness, in a portion of the resin-coated portion that covers the insulating coating.

8 Claims, 5 Drawing Sheets

(51) Int. Cl.
*H02G 15/04* (2006.01)
*B60R 16/02* (2006.01)
*H01B 3/42* (2006.01)
*H01B 7/00* (2006.01)
*H01R 4/18* (2006.01)
*H02G 15/007* (2006.01)
*H01R 33/965* (2006.01)
*H01R 13/52* (2006.01)
*H01R 43/048* (2006.01)
*H01R 4/62* (2006.01)
*H01R 43/00* (2006.01)
*H01R 43/24* (2006.01)

(52) U.S. Cl.
CPC ......... *H02G 15/043* (2013.01); *H02G 15/046* (2013.01); *H01R 4/185* (2013.01); *H01R 4/62* (2013.01); *H01R 9/0518* (2013.01); *H01R 13/52* (2013.01); *H01R 13/5221* (2013.01); *H01R 33/965* (2013.01); *H01R 43/005* (2013.01); *H01R 43/048* (2013.01); *H01R 43/24* (2013.01); *H02G 15/007* (2013.01)

(58) Field of Classification Search
USPC .................................. 439/877, 585, 271, 587
See application file for complete search history.

TERMINAL-EQUIPPED WIRE AND WIRE HARNESS WITH RESIN COATING ON TERMINAL FITTING

CROSS REFERENCE TO RELATED APPLICATIONS

This application claims the priority of Japanese patent application JP2017-118332 filed on Jun. 16, 2017, the entire contents of which are incorporated herein.

TECHNICAL FIELD

The present invention relates to a terminal-equipped wire, and more particularly relates to a terminal-equipped wire in which the periphery of a connection portion between a terminal fitting and a wire is coated with a resin material.

BACKGROUND ART

The trend of the automobile industry to improve fuel efficiency by reducing the weight of vehicles has been growing with increased speed in recent years. Amid this trend, the total weight of wires used for each automobile should not be dismissed, and there is also a demand to reduce the weight of wires. Thus, the use of aluminum wires in which aluminum or an aluminum alloy, which are lightweight and inexpensive, is used as wire conductors has become more widespread.

On the other hand, in view of conductivity and the like, copper or a copper alloy is often used as the material for terminal fittings connected to the wires. When a wire conductor and a terminal fitting are made of different materials as in such cases, corrosion due to contact between dissimilar metals occurs at an electrical connection portion therebetween. There is concern that if this corrosion progresses, it may cause an increase in contact resistance and other problems.

In order to prevent such corrosion due to contact between dissimilar metals, it is effective to prevent the intrusion of water and other corrosive substances into a connection portion between the dissimilar metals. JP 2003-297447A and JP 2012-089431A disclose methods in which the periphery of a connection portion between a wire conductor and a terminal fitting is coated with resin.

JP 2003-297447A and JP 2012-089431A are examples of related art.

In a terminal-equipped wire with a resin-coated portion where the periphery of the connection portion is coated with a resin material, if an end portion where the resin-coated portion and the wire are in contact with each other has a steeply rising shape as shown in JP 2003-297447A, when bending stress is applied to the terminal-equipped wire, the resin-coated portion cannot follow the bending, and thus the stress is concentrated in the end portion of the resin-coated portion, which may result in peeling of the coating resin from the wire.

On the other hand, JP 2012-089431A discloses a configuration in which a tapered portion that tapers off toward the wire is provided in the end portion of the resin-coated portion. According to JP 2012-089431A, the stress can be dispersed, and therefore peeling at the end portion can be prevented, by providing the tapered portion. However, as a result of providing the tapered portion, the resin thickness of the end portion decreases, and accordingly, the strength of the end portion of the resin-coated portion decreases. Due to the decrease in strength, there is a risk that the end portion will crack under a large amount of stress.

If the above-described peeling or cracking reaches the connection portion between the wire conductor and the terminal fitting, water and other corrosive substances may intrude through this portion, and there is a risk that corrosion will progress.

SUMMARY

In view of the above-described issue, it is an object of the present disclosure to provide a terminal-equipped wire in which neither peeling nor cracking is likely to occur in a resin-coated portion when bending stress is applied.

A terminal-equipped wire according to the present disclosure includes a wire with a core wire and an insulating coating with which the core wire is coated; a terminal fitting that is attached to a leading end of the wire, the terminal fitting being electrically connected to the core wire in a core-wire crimp portion and being fixed to the wire from an external side of the insulating coating in a coating crimp portion that is located rearward of the core-wire crimp portion in a longitudinal direction of the wire; and a resin-coated portion where a region containing the core-wire crimp portion and the coating crimp portion are coated with a resin, wherein the resin-coated portion has a thin-walled portion with a reduced thickness, in a portion of the resin-coated portion that covers the insulating coating.

Here, it is sufficient that the "thin-walled portion with a reduced thickness" is a section where a portion of the resin-coated portion is intentionally made thinner than the other portions, and the thin-walled portion is not limited to a thin-walled portion that is formed by providing a protrusion protruding inward inside a mold for use in forming the resin-coated portion through insert molding, and may also include a thin-walled portion that is formed by adjusting the resin thickness during the application of the resin, a thin-walled portion that is formed by forming a resin-coated portion that does not have a thin-walled portion through any of various methods such as molding and application and then cutting out a portion of the resin, and the like. However, a tapered structure in which the resin thickness gradually decreases toward a rear end edge of the resin-coated portion on the rear side of the wire is excluded from the "thin-walled portion".

It is preferable that the resin-coated portion has a polygonal shape in a cross section that is orthogonal to the longitudinal direction of the wire, and has the thin-walled portion in at least one corner portion of the polygonal shape. It is more preferable that the resin-coated portion has the thin-walled portion in every corner portion of the polygonal shape.

The polygonal shape of the cross section is not necessarily required to be an exact polygon, and a corner portion or a side portion thereof may be rounded.

It is preferable that the insulating coating of the wire is exposed in at least a partial region of the thin-walled portion.

It is preferable that a resin thickness of the thin-walled portion discontinuously changes in the longitudinal direction of the wire.

It is preferable that the thin-walled portion has a tapered structure in which a width of the thin-walled portion in the longitudinal direction of the wire gradually narrows from an external side that is away from the wire toward a center of the wire.

It is preferable that a width, in the longitudinal direction of the wire, of the thin-walled portion at a surface of the resin-coated portion is 1% or more of a length of a portion of the resin-coated portion that covers the insulating coating.

It is preferable that the resin from which the resin-coated portion is made is a polyester resin.

A wire harness according to the present disclosure includes the above-described terminal-equipped wire.

With the terminal-equipped wire according to the present disclosure, when bending stress is applied to the resin-coated portion, peeling and cracking of the resin-coated portion can be suppressed.

For example, in the case of a resin-coated portion with a tapered structure in which the resin thickness of the resin-coated portion gradually decreases toward the rear end edge thereof, even though the resin-coated portion can follow bending due to bending stress, the strength of the end portion in which the stress is concentrated decreases, and there is a risk that the resin will crack. On the other hand, the terminal-equipped wire according to the present disclosure has the thin-walled portion with a reduced thickness in a portion of the resin-coated portion that covers the insulating coating, and thus, it is possible to secure a sufficient resin thickness at the rear end edge and thereby increase the strength of the rear end edge and to reduce the resin thickness of the thin-walled portion and thereby improve the ability to follow bending due to bending stress.

In the case where the resin-coated portion has a polygonal shape in a cross section that is orthogonal to the longitudinal direction of the wire, the corner portions have a larger resin thickness than side portions. In this case, when the resin-coated portion has a thin-walled portion in at least one of the corner portions, the resin-coated portion can easily follow bending and can be prevented from cracking and peeling. When the resin-coated portion has a thin-walled portion in every corner portion, the resin-coated portion can accommodate bending in any direction, and a pronounced effect of preventing cracking and peeling can be obtained.

When the insulating coating of the wire is exposed in the thin-walled portion, the resin-coated portion has a particularly excellent ability to follow bending. Moreover, in the case where the resin-coated portion and the thin-walled portion are formed through molding, when the configuration in which the insulating coating of the wire is exposed in the thin-walled portion is adopted, the wire can be fixed using the protrusion of the mold, the protrusion being provided to form the thin-walled portion, during molding of the resin-coated portion, so that displacement of the wire due to pressure that is applied during insert molding can be suppressed.

With the configuration in which the resin thickness of the thin-walled portion discontinuously changes in the longitudinal direction of the wire, both the strength and the ability to follow bending, of the resin-coated portion can be easily obtained. Moreover, with this configuration, the resin-coated portion and the thin-walled portion can be easily formed through molding.

When the thin-walled portion has the tapered structure, the resin coating portions around the thin-walled portion are less likely to interfere with each other when the wire is bent. Thus, for example, even in the case where a large thin-walled portion cannot be provided due to structural limitations or the like, the concentration of stress around the thin-walled portion can be prevented. Moreover, in the case where the resin-coated portion and the thin-walled portion are formed through molding, when the thin-walled portion has the tapered structure, the resin-coated portion can be easily released from the mold during molding, and excellent productivity can be obtained.

When the width, in the longitudinal direction of the wire, of the thin-walled portion at the surface of the resin-coated portion is 1% or more of the length of the portion of the resin-coated portion that covers the insulating coating, the resin portions around the thin-walled portion are less likely to interfere with each other when the resin-coated portion is deformed by bending stress.

When the resin-coated portion is made of a polyester resin, the resin-coated portion has excellent adhesion properties with respect to the insulating coating of the wire. Moreover, a polyester resin has a high modulus of elasticity, and therefore, the resin-coated portion is unlikely to deform during, for example, insertion of the terminal-equipped wire into a housing, and therefore, damage to the resin-coated portion can be suppressed.

With the wire harness according to the present disclosure, since the wire harness includes the above-described terminal-equipped wire, peeling and cracking of the resin-coated portion can be suppressed when bending stress is applied.

EMBODIMENTS

Figure 1:
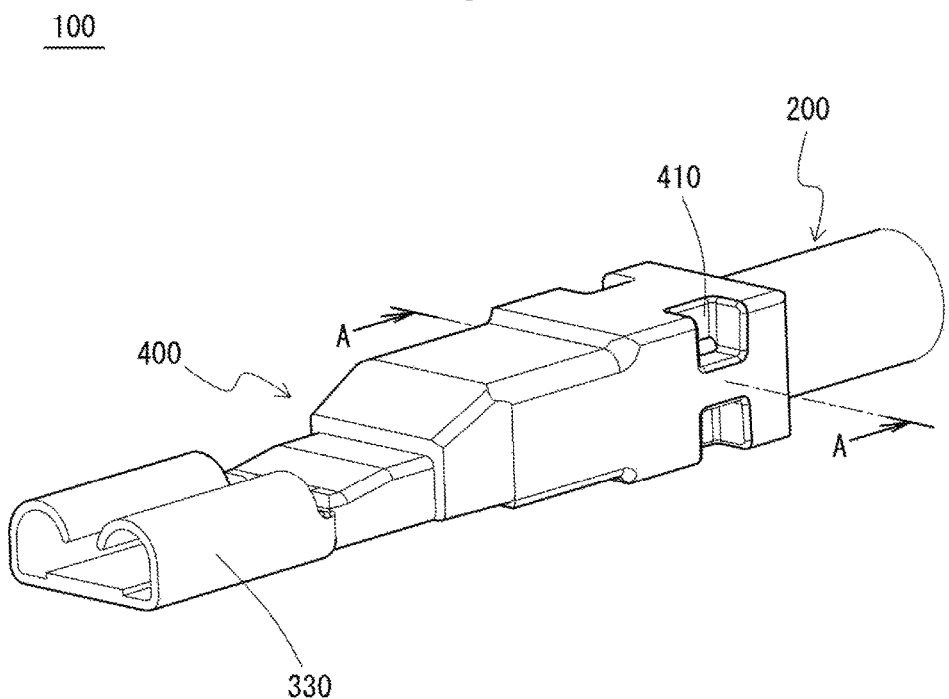
FIG. 1 is a perspective view showing an example of a terminal-equipped wire of the present disclosure.
Figure 2:
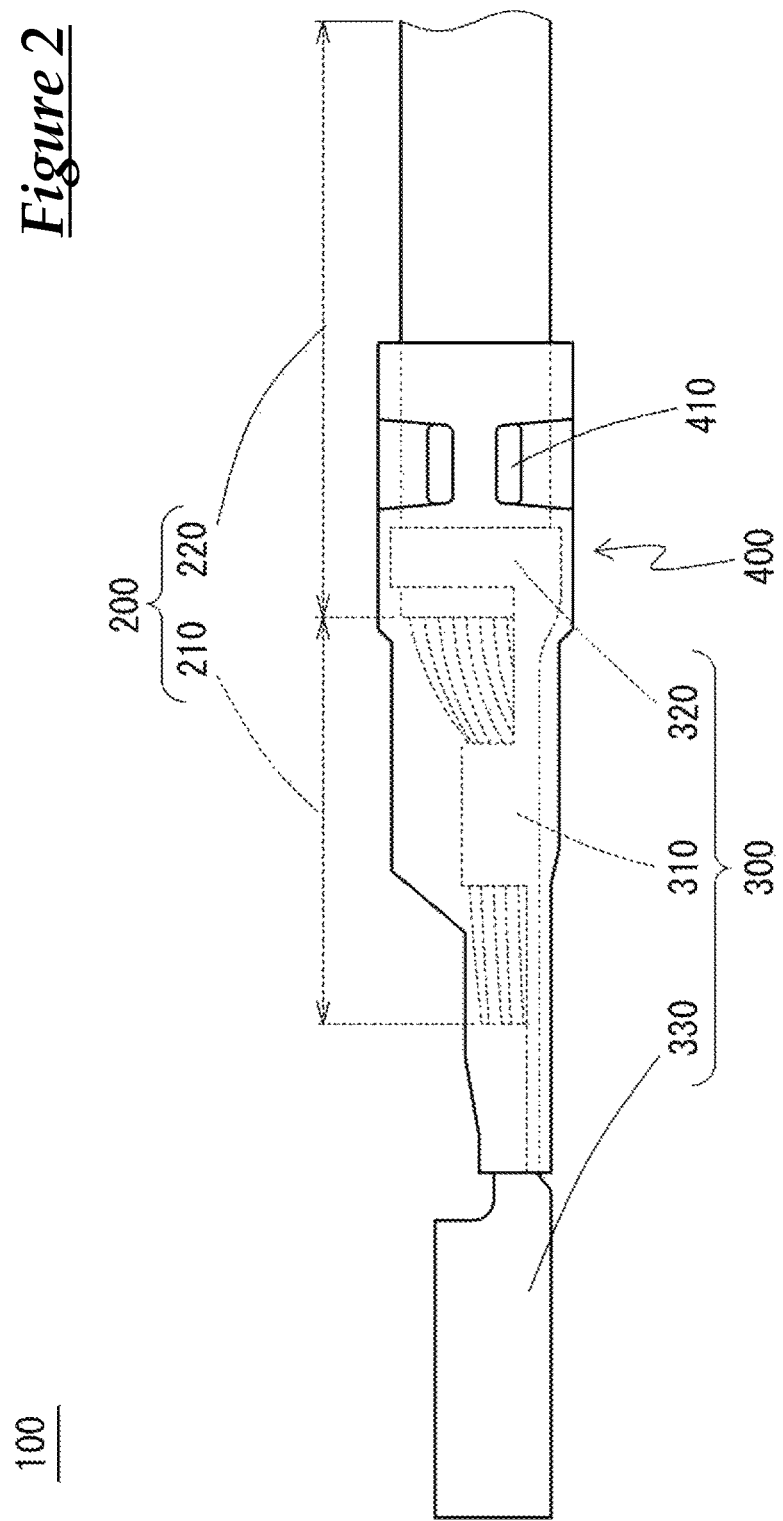
FIG. 2 is a side view of the terminal-equipped wire in FIG. 1.

Next, embodiments of the present disclosure will be described in detail with reference to the drawings. The "resin thickness" as used herein refers to the thickness from a coated wire surface or a terminal fitting surface to the surface of a resin-coated portion, or to the surface of a thin-walled portion in the thin-walled portion of the resin-coated portion. Moreover, in the case where a slightly tapered portion or a curved surface structure is formed in an end portion or the like for the purpose of chamfering or improving mold release, the thickness that is measured irrespective of such portion or structure is used as the resin thickness of that end portion or the like. Overall Configuration A terminal-equipped wire 100 of the present disclosure has a wire 200 and a terminal fitting 300. The wire 200 has a configuration in which the outer periphery of a bundle of wire conductors 10 is coated with an insulating coating 20, and a core wire portion 210 where a core wire is uncoated is provided at a leading end of the wire 200. The terminal fitting 300 integrally includes an electrical contact portion 330 that is to be electrically connected to another terminal, a core-wire crimp portion 310 that is crimped onto the core wire portion 210, and a coating crimp portion 320 that is crimped onto a coated portion 220.

A resin-coated portion 400 made of a resin is formed in a region from a portion of the coated portion 220 that is located rearward of a portion where the coating crimp portion 320 is crimped onto the wire 200 to a leading end of the core wire portion 210. Thus, a region containing the outer periphery of the core-wire crimp portion 310 and the coating crimp portion 320, the outer periphery of a portion between the core-wire crimp portion 310 and the coating crimp portion 320, the leading end of the core wire portion 210, and a portion of the coated portion 220 that is located on the leading end side is coated with resin. The resin-coated portion 400 is molded so as to cover the entire periphery of the above-described region. The thus formed resin-coated portion 400 can prevent the intrusion of water and other corrosive substances into a contact portion between the wire 200 and the terminal fitting 300.

The wire 200 is formed by coating the outer periphery of the wire conductors 10, which collectively serve as the core wire, with the insulating coating 20. Each wire conductor 10 is formed of a stranded wire composed of a plurality of strands twisted together. In this case, the stranded wire may be composed of one type of metal strand or may be composed of two or more types of metal strands. Also, the stranded wire may contain strands made of an organic fiber, for example, in addition to the metal strands. A reinforcing wire or the like for reinforcing the wire 200 may also be contained in the stranded wire.

Examples of the material for the metal strands composing the above-described wire conductors 10 include copper, a copper alloy, aluminum, and an aluminum alloy, or copper, a copper alloy, aluminum, and an aluminum alloy that are plated with various plating materials. From the standpoint of, for example, reducing the wire weight, it is preferable to use aluminum or an aluminum alloy. Moreover, examples of the material for metal strands serving as reinforcing wires include a copper alloy, titanium, tungsten, and stainless steel. Moreover, examples of an organic fiber serving as the reinforcing wire include Kevlar.

Materials that are used for ordinary wires can be used as the material for the insulating coating 20 of the wire 200. Examples thereof include rubber, polyolefin, PVC, and a thermoplastic elastomer. These materials may be used alone or may be used as a combination of two or more. Various additives may also be added to these materials as appropriate.

In addition to brass, which is commonly used, various copper alloys, copper, and the like can be used as the base material of the terminal fitting 300. A portion or the entirety of the surface of the terminal fitting 300 may also be plated with various metals such as tin, nickel, and gold, or alloys containing these metals.

Although the wire conductors 10 and the terminal fitting 300 may be made of any metal material, copper or a copper alloy is commonly used as the base material of the terminal fitting 300. On the other hand, using aluminum or an aluminum alloy for the wire conductors 10 is becoming more common. Thus, there are cases where the wire conductors 10 and the terminal fitting 300 are made of different metals. In the case where the wire conductors 10 and the terminal fitting 300 are made of different metals, there is a risk that if water or another corrosive substance is present in a connection portion therebetween, corrosion will occur between the dissimilar metals. However, corrosion between the dissimilar metals can be suppressed by coating a connecting section between the terminal fitting 300 and the wire conductors 10 with resin and thereby preventing the intrusion of such corrosive substances.

The resin-coated portion 400 is formed such that the entire periphery of the core-wire crimp portion 310 and the coating crimp portion 320 is coated, and serves to prevent the intrusion of corrosive substances.

Examples of the resin from which the resin-coated portion 400 is made include, but are not limited to, polyester resins, thermoplastic elastomers, polyamide resins, polyolefin resins, polyurethane resins, and acrylic resins. For example, in view of adhesion to a resin material and the like, polyester resins are preferable, and in view of adhesion to a metal material and the like, thermoplastic elastomers are preferable. These resins may be used alone or may be used in combination of two or more. When used in combination, two or more resins may be mixed or may be laminated. Moreover, these resins may also contain various additives as necessary.

In the case where the resin-coated portion 400 is made of a polyester resin, the resin-coated portion 400 has excellent adhesion properties with respect to an insulating coating 20 containing PVC or the like as the main material. Moreover, polyester resins have a high modulus of elasticity, and can suppress deformation and breakage of the resin-coated portion 400 during insertion/removal of the terminal fitting into/from a connector housing. From the standpoint of preventing breakage of the resin-coated portion 400, the modulus of elasticity of the polyester resin is preferably 100 MPa or more and more preferably 150 MPa or more.

Examples of the polyester resin include, but are not limited to, polybutylene terephthalate (PBT), polyethylene terephthalate (PET), polytrimethylene terephthalate, polyethylene naphthalate, and polybutylene naphthalate. PBT is preferably used because PBT has a flexural modulus of about 200 MPa as determined in conformity with ISO 178, makes the resin-coated portion 400 less likely to break as described above, and also has excellent adhesion properties with respect to the insulating coating 20 of the wire.

The resin-coated portion 400 has a thin-walled portion 410 in a portion of the resin-coated portion 400 which is in direct contact with the surface of the insulating coating 20 between the coating crimp portion 220 and a rear end edge of the resin-coated portion 400 on the rear side of the wire and with which the outer periphery of the wire is coated. In the thin-walled portion 410, the thickness of the resin-coated portion 400 is reduced $X_2$, and the resin thickness is thereby made thinner than in the other portions $X_1$. As described above, it is sufficient that the thin-walled portion 410 is a section where a portion of the resin-coated portion is intentionally made thinner than the other portions, and whether the resin thickness changes discontinuously or continuously does not matter. However, a tapered structure in which the resin thickness gradually decreases toward the rear end edge on the rear side of the wire is excluded from the "thin-walled portion".

As a result of forming the thin-walled portion 410, the section modulus of the resin-coated portion decreases. This enables the resin-coated portion 400 to easily follow bending due to bending stress, and the stress to be thus dispersed. Therefore, when bending stress is applied to the terminal-equipped wire, peeling of the resin-coated portion 400 from the wire 200 can be prevented. Furthermore, a sufficient resin thickness can be secured at the rear end edge of the resin-coated portion 400, and cracking of the resin-coated portion can be prevented. This thin-walled portion 410 can be formed as will be described later by means of, for example, a method in which the resin-coated portion is molded using a mold having a protrusion corresponding to the thin-walled portion 410.

Figure 4:
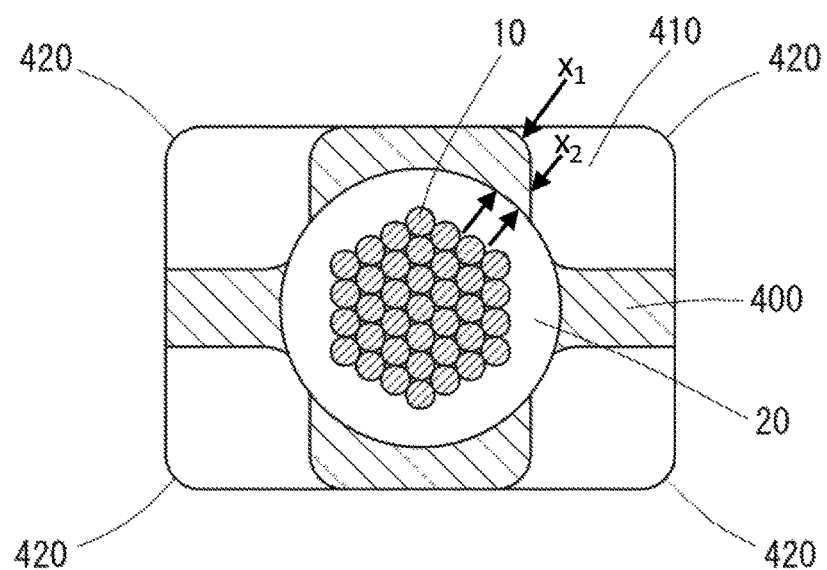
FIG. 4 cross-sectional view taken along line A-A in FIG. 1.

In the example shown in FIG. 4, the resin-coated portion 400 has a quadrangular shape in a cross section that is orthogonal to the longitudinal direction of the wire. However, the resin-coated portion 400 may also have another polygonal shape, such as a triangular shape or a pentagonal shape, or a shape other than polygonal shapes, such as a circular shape, in a cross section. In the case where the resin-coated portion 400 has a polygonal shape in a cross section, corner portions 420 of the resin-coated portion 400 have a large resin thickness and are hard to bend. It is preferable that a thin-walled portion 410 is provided in at least one corner portion 420 of the polygonal shape, and it is more preferable that thin-walled portions 410 are provided in all of the corner portions 420. With such a configuration, the resin-coated portion 400 can follow bending, and peeling and cracking are particularly easily prevented. Moreover, the thin-walled portion 410 is not limited to the corner portions 420, and may be provided running completely around the resin-coated portion 400 in and along the periphery thereof.

From the standpoint of increasing the strength of the resin-coated portion 400, it is preferable to secure a sufficient thickness in portions other than the thin-walled portion 410, for example, a portion with which the coating crimp portion 220 is coated, a portion with which the core wire portion 110 is coated, and the like.

It is preferable that the resin-coated portion 400 does not have a tapered structure in which the resin thickness gradually decreases toward the end portion of the resin-coated portion 400 on the rear side of the wire. However, this does not apply to a slightly tapered portion or a curved surface shape that are formed for the purposes of chamfering or improving mold release. A slightly tapered portion refers to a tapered portion having a rising angle of more than 45° and less than 90°. The configuration in which the resin-coated portion 400 does not have a tapered structure in its end portion makes it possible to increase the resin thickness of the end portion, thereby making it possible to maintain the strength of the end portion.

In the thin-walled portion 410, it is preferable that the insulating coating 20 of the wire is exposed. When the insulating coating 20 of the wire is exposed in the thin-walled portion 410, the thin-walled portion 410 has an even more improved ability to follow bending. Moreover, the configuration in which the insulating coating 20 of the wire is exposed in the thin-walled portion 410 makes it possible to fix the wire using the protrusion of the mold during molding of the resin-coated portion 400, thereby making it possible to suppress displacement of the wire 200 during molding.

Even when the insulating coating 20 of the wire is exposed in the thin-walled portion 410, the effect of this configuration on the anti-corrosion properties is small. If the adhesion between the resin-coated portion and the insulating coating is sufficiently strong, the intrusion of water and other corrosive substances through the exposed portion is unlikely to occur.

Figure 3:
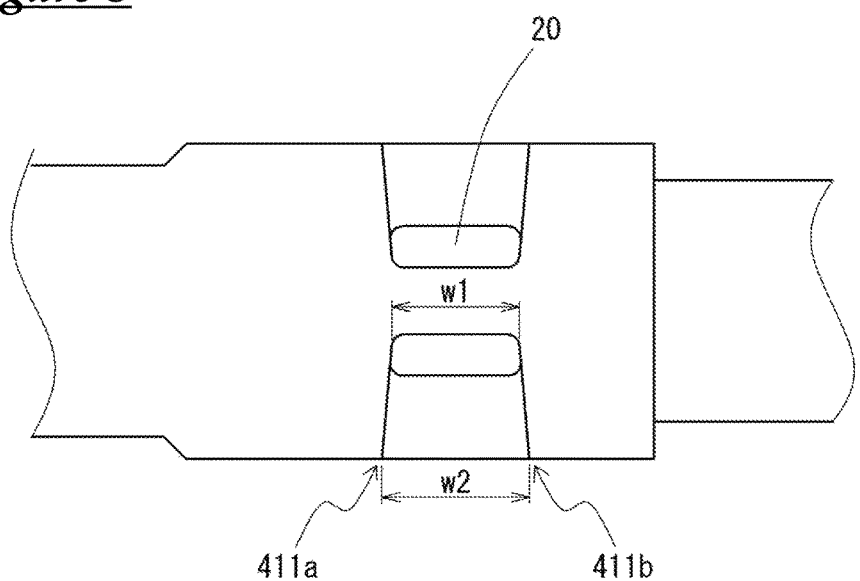
FIG. 3 is an enlarged side view showing an example of a thin-walled portion of an anti-corrosion terminal-equipped wire of the present disclosure.

It is preferable that, as shown in FIG. 3, the thin-walled portion 410 has a tapered structure in which the width thereof in the longitudinal direction of the wire gradually decreases from a position on a distal, external side of the resin-coated portion toward a position on an inner side that is nearer to the wire. That is to say, it is preferable that a relationship W1<W2 is established. With the configuration in which the thin-walled portion has a tapered structure that becomes narrower toward the center, even if W1 is small due to structural limitations or the like, resin portions 411a and 411b around the thin-walled portion 410 are made less likely to interfere with each other under bending stress, by setting W2 to a sufficient width. Furthermore, with the configuration in which the thin-walled portion 410 has a tapered structure, the resin-coated portion can be easily released from the mold during molding, and therefore, excellent productivity is obtained.

It is preferable that the width W2, in the longitudinal direction of the wire, of the thin-walled portion 410 at the surface of the resin-coated portion is 1% or more of the length of a portion where the coated portion 220 is coated with the resin-coated portion. When W2 is within the above-described range, the resin portions 411a and 411b around the thin-walled portion 410 are less likely to interfere with each other under bending stress.

Figure 5A:
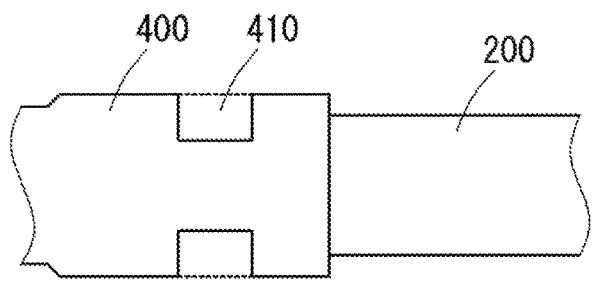
FIGS. 5A to 5D are conceptual diagrams schematically illustrating side surface shapes of the thin-walled portion according to other embodiments.
Figure 5B:
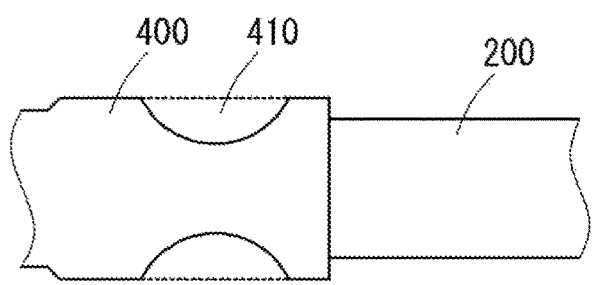
Figure 5C:
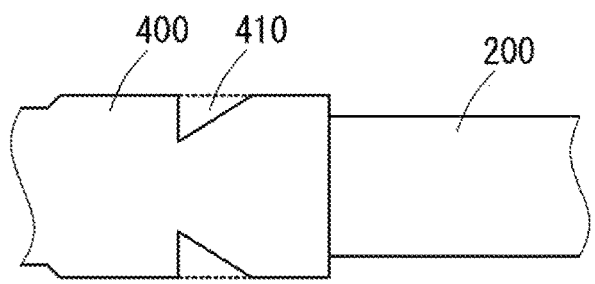
Figure 5D:
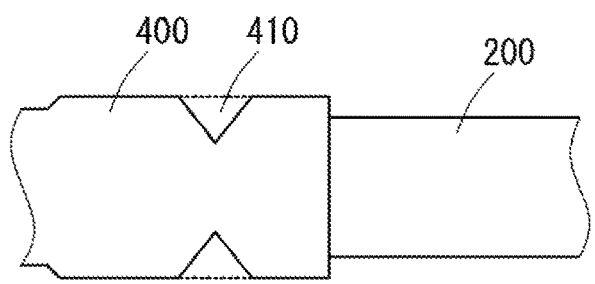

The specific shape of the thin-walled portion 410 is not limited. It is preferable that the thin-walled portion 410 is thinner than the resin thickness of the rear end edge of the resin-coated portion 400. FIGS. 5A to 5D are schematic diagrams illustrating exemplary shapes of the thin-walled portion 410. FIG. 5A illustrates a structure in which, as is the case with the embodiment shown in FIGS. 1 to 4, the resin thickness discontinuously and steeply changes in the longitudinal direction of the wire, FIG. 5B illustrates a structure in which the resin thickness continuously and gently changes in the longitudinal direction of the wire, FIG. 5C illustrates a structure in which the resin thickness gradually decreases from the rear end edge of the resin-coated portion 400 toward the coating crimp portion, and FIG. 5D illustrates a V-shaped structure. When a structure in which the resin thickness steeply changes as illustrated in FIG. 5A is adopted, the thin-walled area can be minimized, and it is therefore possible to impart the ability to follow bending to the resin-coated portion 400 while maintaining the strength of the resin-coated portion 400.

A wire harness according to the present disclosure is constituted by a plurality of terminal-equipped wires including the above-described terminal-equipped wire 100. All of the terminal-equipped wires constituting the wire harness may be the terminal-equipped wires 100 according to the present disclosure, or only one or some of them may be the terminal-equipped wires 100 according to the present disclosure.

A method for producing the terminal-equipped wire 100 according to the present disclosure will now be described.

First, the core wire portion 210 is formed by stripping off the insulating coating 20 at the leading end of the wire 200. The core wire portion 210 and the core-wire crimp portion 310 of the terminal fitting 300 are crimped together, and the coated portion 220 that is located rearward of the core wire portion 210 and coated with the insulating coating 20 and the coating crimp portion 320 of the terminal fitting 300 are crimped together.

Then, the resin-coated portion 400 is formed in a region from a position rearward of a portion where the coating crimp portion 320 is crimped onto the wire 200 to the leading end of the core wire portion 210. The resin-coated portion 400 can be formed using a molding method in which the resin is injected into a mold, or through application of the resin to the periphery of the wire 200 and the terminal fitting 300, for example.

The thin-walled portion 410 is provided in a portion of the resin-coated portion 400 between the coating crimp portion 320 and the rear end edge of the resin-coated portion 400 on the rear side of the wire. Examples of the method for forming the thin-walled portion 410 include a method in which a protrusion protruding inward is provided inside the mold used for molding the resin-coated portion, thereby forming the thin-walled portion, a method in which the resin thickness is adjusted during the application of the resin, thereby forming the thin-walled portion, and a method in which a resin-coated portion that does not have a thin-walled portion is formed using any of various methods such as molding and application, and then a portion of the resin is cut out, thereby forming the thin-walled portion. From the standpoint of enabling easy formation and the like of the thin-walled portion, it is preferable to adopt the method for reducing the thickness in which a protrusion protruding inward is provided inside the mold for use in molding of the resin-coated portion, thereby forming the thin-walled portion through molding. This method will be described below.

First, the wire 200 and the terminal fitting 300 that have been crimped together are placed in the mold. In the mold, the inward protruding protrusion is provided beforehand between the position corresponding to the coating crimp portion 320 and the position corresponding to the rear end edge on the rear side of the wire. A resin is injected into this mold. As a result, the resin-coated portion 400 having the thin-walled portion 410 is formed.

At this time, if the above-described protrusion has a large protruding amount, the resultant thin-walled portion has a small resin thickness, and if the protrusion has a small protruding amount, the resultant thin-walled portion has a large resin thickness. Furthermore, if a configuration in which a portion of the protrusion comes into contact with the wire 200 is adopted, the insulating coating 20 of the wire is exposed in the formed thin-walled portion 410 as shown in FIGS. 1 to 4. This configuration in which the protrusion comes into contact with the wire 200 makes it possible to fix the wire 200 using the protrusion, thereby making it possible to prevent displacement of the wire 200 due to pressure that is applied during injection of the resin.

It is preferable that the above-described protrusion has a tapered structure with the width of the protrusion in the longitudinal direction of the wire gradually decreasing toward the central portion of the resin-coated portion in the thickness direction. When the protrusion has a tapered structure, a thin-walled portion 410 having a tapered structure can be formed, so that the resin-coated portion 400 can be easily released from the mold. Thus, excellent productivity is obtained.

The terminal-equipped wire of the present disclosure is connected to a connector housing or the like that is compatible with the terminal fitting 300. At this time, even when bending stress is applied to the terminal-equipped wire 100, peeling and cracking of the resin-coated portion 400 are unlikely to occur. Therefore, the terminal-equipped wire 100 of the present disclosure has high anti-corrosion performance and can be preferably used as a wire particularly for automobiles.

Although embodiments of the present disclosure have been described in detail above, the present invention is not limited to the foregoing embodiments, and various modifications can be made thereto without departing from the gist of the present invention.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

100 Terminal-equipped wire
10 Wire conductor
20 Insulating coating
200 Wire
210 Core wire portion
220 Coated portion
300 Terminal fitting
310 Core-wire crimp portion
320 Coating crimp portion
330 Electrical contact portion
400 Resin-coated portion
410 Thin-walled portion
411a, 411b Resin portion around thin-walled portion
420 Corner portion

What is claimed is:

1. A terminal-equipped wire comprising:
   a wire with a core wire and an insulating coating with which the core wire is coated;
   a terminal fitting that is attached to a leading end of the wire, the terminal fitting being electrically connected to the core wire in a core-wire crimp portion and being fixed to the wire from an external side of the insulating coating in a coating crimp portion that is located rearward of the core-wire crimp portion in a longitudinal direction of the wire; and
   a resin-coated portion where a region containing the core-wire crimp portion and the coating crimp portion are coated with a resin,
   wherein, in a portion of the resin-coated portion that covers the insulating coating, the resin-coated portion has a thin-walled portion with a reduced thickness, and
   the resin-coated portion has a polygonal shape in a cross section that is orthogonal to the longitudinal direction of the wire, and has the thin-walled portion in at least one corner portion of the polygonal shape.

2. The terminal-equipped wire according to claim 1, wherein the resin-coated portion has a polygonal shape in a cross section that is orthogonal to the longitudinal direction of the wire, and has the thin-walled portion in every corner portion of the polygonal shape.

3. The terminal-equipped wire according to claim 1, wherein a width, in the longitudinal direction of the wire, of the thin-walled portion at a surface of the resin-coated portion is 1% or more of a length of a portion of the resin-coated portion that covers the insulating coating.

4. The terminal-equipped wire according to claim 1, wherein the resin from which the resin-coated portion is made is a polyester resin.

5. A wire harness comprising the terminal-equipped wire according to claim 1.

6. A terminal-equipped wire comprising:
a wire with a core wire and an insulating coating with which the core wire is coated;
a terminal fitting that is attached to a leading end of the wire, the terminal fitting being electrically connected to the core wire in a core-wire crimp portion and being fixed to the wire from an external side of the insulating coating in a coating crimp portion that is located rearward of the core-wire crimp portion in a longitudinal direction of the wire; and
a resin-coated portion where a region containing the core-wire crimp portion and the coating crimp portion are coated with a resin,
wherein, in a portion of the resin-coated portion that covers the insulating coating, the resin-coated portion has a thin-walled portion with a reduced thickness, and
the insulating coating of the wire is exposed in at least a partial region of the thin-walled portion.

7. A terminal-equipped wire comprising:
a wire with a core wire and an insulating coating with which the core wire is coated;
a terminal fitting that is attached to a leading end of the wire, the terminal fitting being electrically connected to the core wire in a core-wire crimp portion and being fixed to the wire from an external side of the insulating coating in a coating crimp portion that is located rearward of the core-wire crimp portion in a longitudinal direction of the wire; and
a resin-coated portion where a region containing the core-wire crimp portion and the coating crimp portion are coated with a resin,
wherein, in a portion of the resin-coated portion that covers the insulating coating, the resin-coated portion has a thin-walled portion with a reduced thickness, and
a resin thickness of the thin-walled portion discontinuously changes in the longitudinal direction of the wire.

8. A terminal-equipped wire comprising:
a wire with a core wire and an insulating coating with which the core wire is coated;
a terminal fitting that is attached to a leading end of the wire, the terminal fitting being electrically connected to the core wire in a core-wire crimp portion and being fixed to the wire from an external side of the insulating coating in a coating crimp portion that is located rearward of the core-wire crimp portion in a longitudinal direction of the wire; and
a resin-coated portion where a region containing the core-wire crimp portion and the coating crimp portion are coated with a resin,
wherein, in a portion of the resin-coated portion that covers the insulating coating, the resin-coated portion has a thin-walled portion with a reduced thickness, and
the thin-walled portion has a tapered structure in which a width of the thin-walled portion in the longitudinal direction of the wire gradually narrows from an external side that is away from the wire toward a center of the wire.

* * * * *